Jan. 25, 1944.     A. E. YOUNG     2,340,165

PLOW

Filed Feb. 3, 1941     3 Sheets-Sheet 1

INVENTOR:
AUSTIN E. YOUNG

BY *J.B.H.R.C.Johnson*

ATTORNEYS.

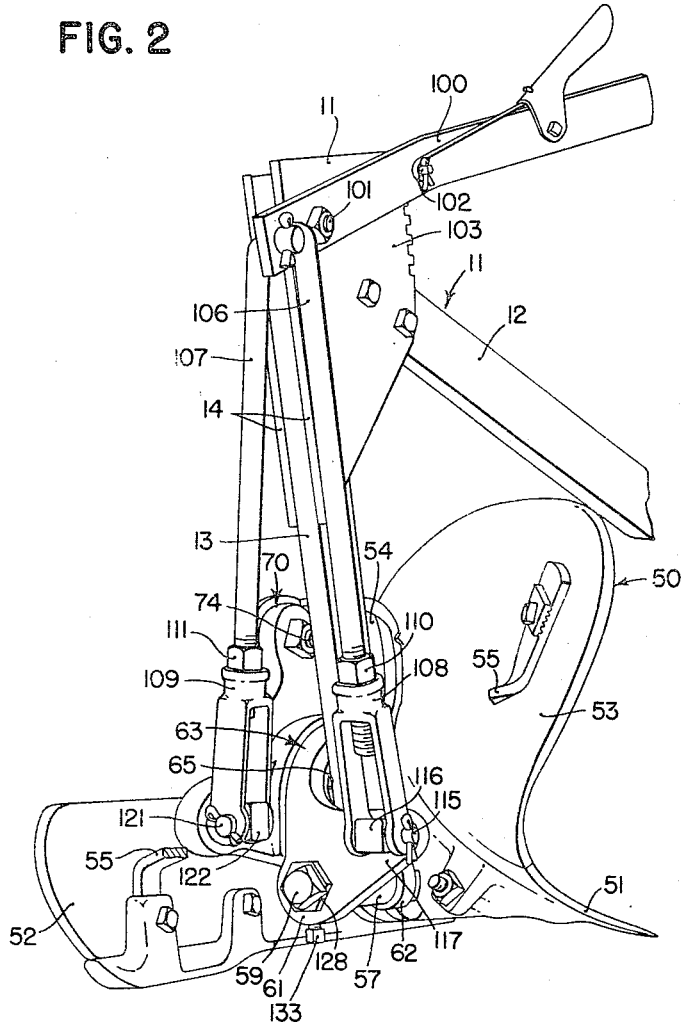

Jan. 25, 1944.                A. E. YOUNG                2,340,165
                                 PLOW
                         Filed Feb. 3, 1941            3 Sheets-Sheet 3

INVENTOR:
AUSTIN E. YOUNG
BY
ATTORNEYS.

Patented Jan. 25, 1944

2,340,165

UNITED STATES PATENT OFFICE 2,340,165

PLOW

Austin E. Young, Syracuse, N. Y., assignor to Syracuse Chilled Plow Company, Inc., Syracuse, N. Y., a corporation of New York Application February 3, 1941, Serial No. 377,095

16 Claims. (Cl. 97—197)

The present invention relates generally to agricultural implements and is more particularly concerned with moldboard plows.

The object and general nature of the present invention is the provision of a plow in which the plow bottom is pivotally connected with its plow beam for movement thereto in two planes whereby depth and leveling may be accomplished simultaneously and with one operating means. More particularly, it is a feature of this invention to provide a tractor plow, in which the wheel or wheels at one side of the tractor operate in a previously formed furrow, embodying means for simultaneously adjusting the depth and leveling the plow so as to accommodate the tilted position of the tractor for any depth of plowing, the degree of tilt increasing with an increase in depth, and vice versa. A further feature of this invention is the provision of means for adjusting the landing of the plow bottom relative to its beam, or in other words, shifting the position of the point of the plow bottom in a generally lateral direction relative to the plow beam and/or the tractor.

Another important feature of the present invention is the provision of a plow wherein a plow bottom is pivotally connected with its beam for movement about two or more axes disposed substantially directly behind the point of greatest resistance of the plow bottom, whereby the loads sustained by the pivotal connections are at a minimum. It is also a feature of this invention to provide a tractor plow wherein the plow beam is held in upright position by its connection with the tractor and the plow bottom is connected with the beam for movement about a plurality of pivot axes located at the approximate center of resistance of the bottom. A further feature is the provision of means reacting against the plow beam for adjusting the position of the plow bottom relative to the plow beam to simultaneously adjust the depth and leveling of the bottom.

These and other objects and advantages of the present invention will be apparent to those skilled in the art after a consideration of the following detailed description, taken in conjunction with the accompanying drawings illustrating the preferred embodiment of my invention.

In the drawings:

Figure 2 is a rear view of the right-hand plow bottom shown in Figure 1;

Figure 1:
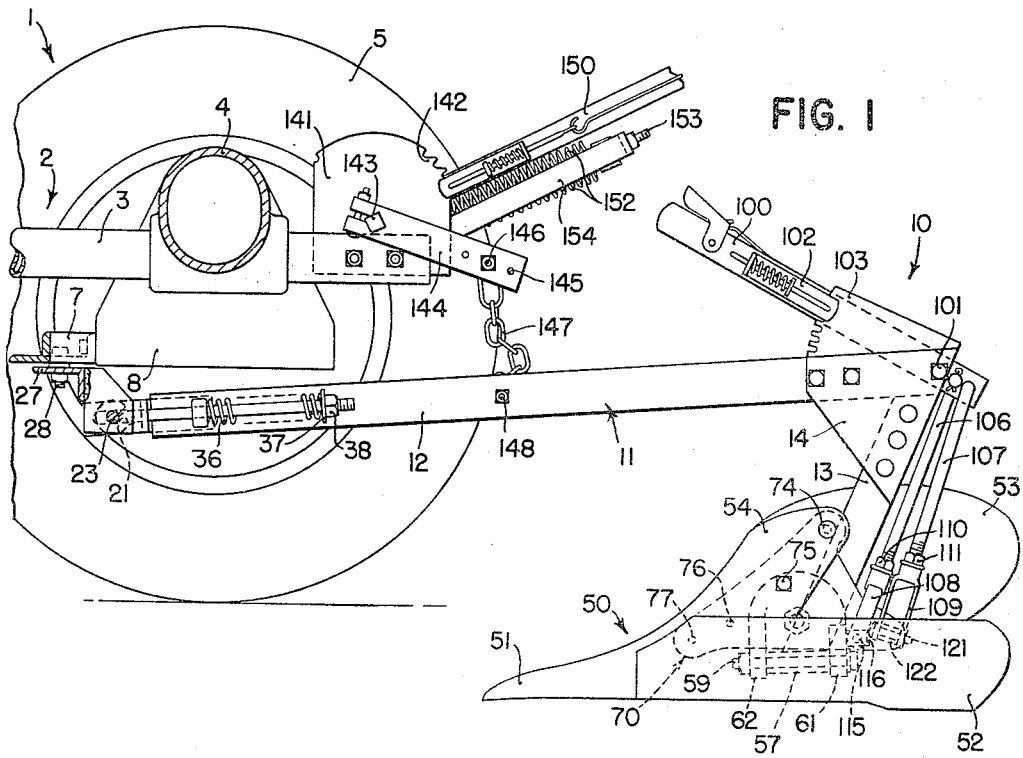
Figure 1 is a side view of a tractor two-way plow in which the principles of the present invention have been incorporated.

Referring now to the drawings, particularly Figure 1, the reference numeral 1 indicates in its entirety a farm tractor which may be of any suitable construction and which is therefore shown only fragmentarily. The tractor 1 includes a frame 2 having frame bars 3, the frame 2 serving as a supporting and propelling means for the plowing units with which the present invention is more particularly concerned. The tractor 1 also includes a rear axle structure 4 and rear wheels 5, and the tractor is usually provided with a transverse drawbar, such as the one indicated by the reference numeral 7, the latter being fixed to the tractor 1 in any suitable manner, preferably to the rear axle drive housings 8 which form a part of the rear axle structure 4. Preferably, the tractor drawbar 7 is in the form of an angle bar having apertures to which implements may selectively be attached.

The present invention is disclosed in a two-way plow, but since the right and left hand plowing units are identical, except that one is a right hand unit and the other a left hand unit, a detailed description of one unit will suffice. Also, it is to be understood that the present invention is not necessarily limited to two-way plows but may be embodied in other types of plows.

Figures 3, 4:
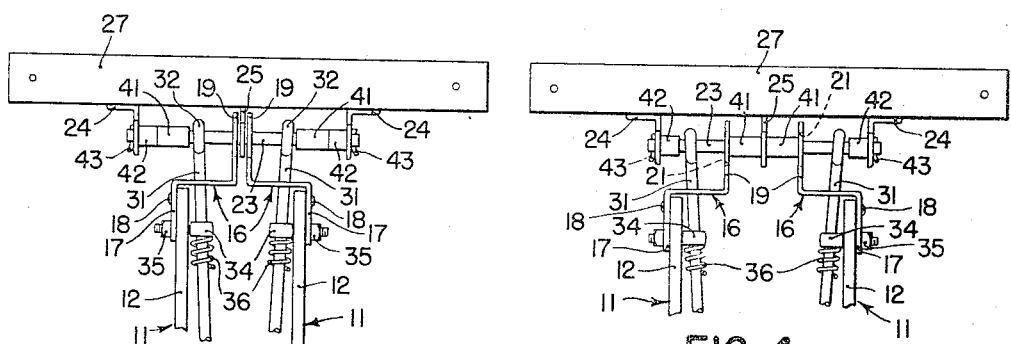
Figures 3 and 4 show the two optional arrangements by which the right and left hand plow beams are connected with the tractor and held in upright position.

The right hand plowing unit is indicated in its entirety by the reference numeral 10 and includes a plow beam 11 of more or less conventional construction, consisting of a bar 12 and a downwardly disposed standard 13 fixed to the bar 12 by one or more plates 14 bolted and/or riveted to the associated members. A member 16 of Z formation has one leg 17 secured, as by a rivet 18, to the front end of the bar 12, and the other leg 19 of the member 16 is slotted, as at 21, to receive a transverse draft rod 23. The latter is carried in apertured brackets 24 and 25 that are welded to a transverse angle 27 which is adapted to be bolted, as at 28, to the tractor drawbar 7 adjacent the ends thereof. It will be noted that by virtue of the Z-bar 16, the end 19 thereof is connected in laterally offset relation to the draft rod 23, being laterally inwardly of the beam 11 when the parts are arranged as shown in Figure 3. The power of the tractor is transmitted directly to the beam 11 by means of a pull rod 31 having an eye 32 encircling the adjacent end of the transverse draft rod 23. The rear end of the pull rod 31 extends rearwardly through an eye-bolt 34 that is fixed, as by a nut 35, to the front end of the beam 11. The eye-bolt also serves to fasten the Z member 16 to the front of the plow beam, as best shown in Figure 3. A spring 36 is disposed about the rear portion of the pull rod 31 and at its rear end engages a washer 37, the position of which is governed by an adjusting nut 38 screwed onto the rear threaded end of the pull rod. Thus, the forward pull is transmitted from the tractor to the plow through a spring cushion hitch, as just described, which reduces the shock of striking an obstruction when plowing.

From Figure 3, it will be noted that the eye 32 of the pull rod 31 embraces the draft rod 23 an appreciable distance laterally outwardly beyond the slotted end 19 of the Z-shaped member 16. The aperture in the latter, through which the pull rod 31 extends, forms a snug fit, and since the rear portion of the pull rod 31 is disposed in the eye of the bolt 34 it will be seen that the plow beam 11 is held against movement about a generally longitudinal axis, or, in other words, the plow beam is held in an upright position relative to the tractor but is permitted to swing generally vertically about the draft rod 23 as an axis. The slot 21 accommodates longitudinal movement of the plow beam 11 but does not minimize the restrain against lateral tilting of the plow beam.

The position of the hitch connection for each plow beam on the draft rod 23 may be varied to permit the use of plow bottoms of different widths. For example, when plow bottoms of fairly wide construction are utilized, the plow beam 11 is disposed with the end 19 of the member substantially up against the central bracket 25, and in order to hold the beam in this position, a pair of spacers 41 and 42 are placed on the draft rod 23 laterally outwardly of the pull rod 31. It will be understood that the draft rod 23 is loosely supported in the brackets 24 and 25, and may be held removably in position therein by cotter keys 43 or other suitable means. When it is desired to use more narrow bottoms, the hitch connections are shifted into the positions shown in Figure 4, with the longer of the two spacing sleeves 41 disposed between the end 19 and the center bracket 25. This change of hitch when using plow bottoms of different widths is desirable in order that the tractor wheels may operate properly in the previously opened furrow, and by this means it is unnecessary to change the tread of the tractor when changing to plow bottoms of different widths. According to the present invention, therefore, this implement may be used effectively with tractors of fixed tread.

One of the most important features of the present invention is the new and improved means by which the plow bottom is connected to the plow beam, and such means will now be described.

Figure 5:
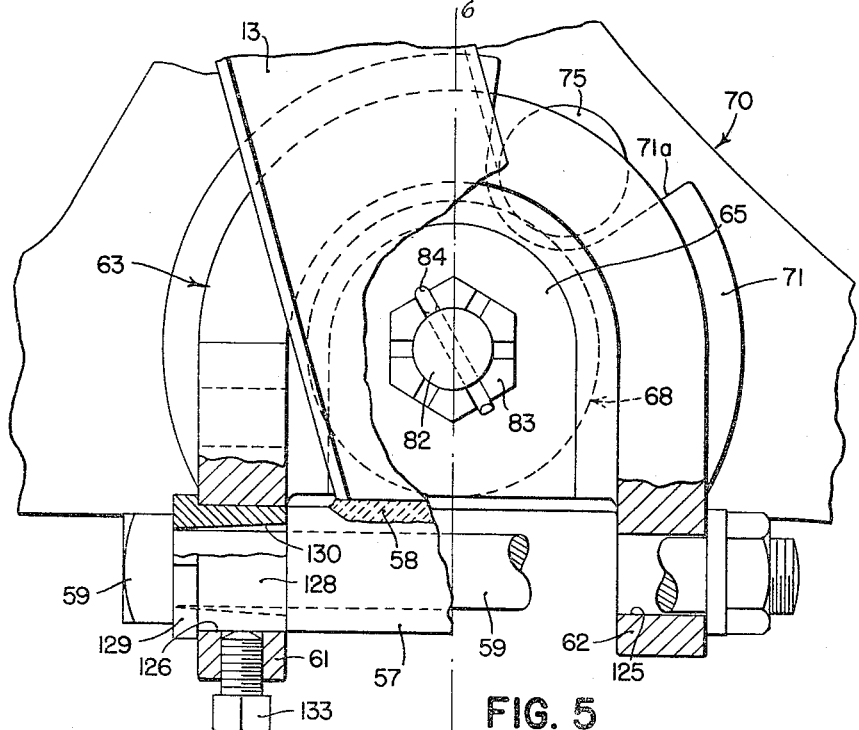
Figure 5 is an enlarged fragmentary side view, certain parts being shown in section, showing details of the connections between the plow beam and the plow base.
Figure 6:
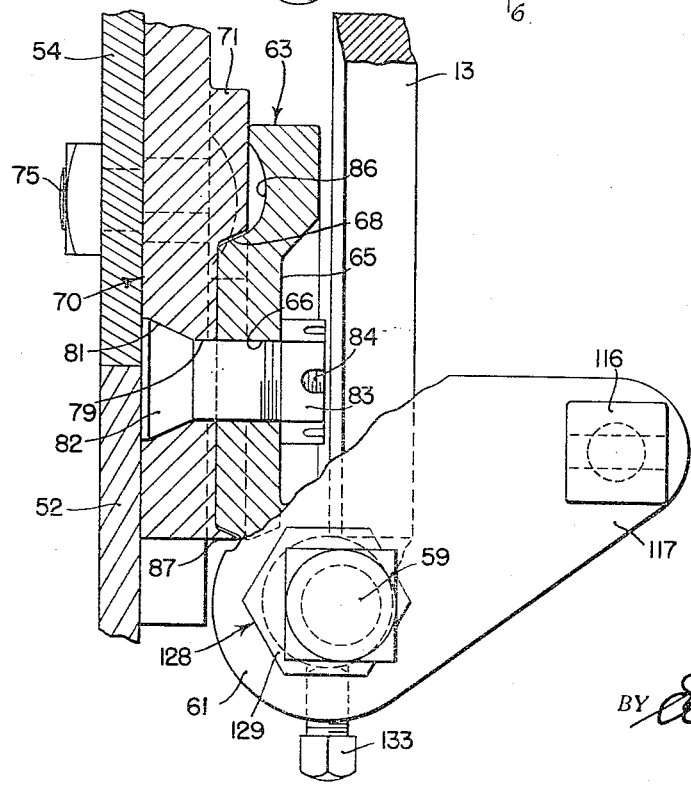
Figure 6 is a view taken generally along the line 6—6 of Figure 5, the lower portion of the standard and a part of the swivel block pivoted thereto being shown in elevation.

Referring more particularly to Figures 1 and 2, the plow bottom is indicated in its entirety by the reference numeral 50 and is of the conventional moldboard type, including a share 51, a landside 52, a moldboard 53, a frog 54 to which the moldboard, share and landside are bolted, as is conventional practice, and a moldboard brace 55. According to the present invention, however, the frog 54 is not fixed directly to the plow beam standard 13 but is connected therewith by means affording simultaneous depth and leveling adjustments and also landing adjustment. To this end, a short sleeve 57 is fixed, as at 58 (Figure 5), to the lower end of the standard 13. A pivot bolt 59 is received in the sleeve 57, fitting snugly therein, and the ends of the pivot bolt 59 pass through arms 61 and 62 formed on or carried by a swivel block 63. The latter includes a central section 65 which is offset laterally inwardly and is provided with a pivot hole 66.

The central offset section 65 of the swivel block 63 is received in a socket 68 formed in a generally triangular shaped attaching plate or casting, indicated in its entirety by the reference numeral 70. The socket 68 preferably is formed by an annulus 71 projecting outwardly from the face of the member 70. The member 70 is provided with a plurality of bolt holes by which the member 70 may be securely bolted, as at 74, 75, 76, and 77, to the frog 54 of the plow bottom 50. The bolts and bolt holes are arranged to fit conventional bottoms and where, as in the present instance, one of the bolt holes intersect the annulus 71, the latter is interrupted, as at 71a, to accommodate the head of the bolt 75. The frog iron or casting 70 is also provided with an aperture 79 centrally of the annulus 71 and arranged to register with the bolt hole 66 in the swivel block 63. The face of the frog iron 70 opposite the annulus 71 is counterbored, as at 81, to receive the head of a bolt 82 that extends through the members 63 and 70 and pivotally connects them together for relative rocking movement about a transverse axis. A castellated nut 83 is screwed onto the laterally directed end of the bolt 82 and is held in adjusted position thereon by a cotter key 84 or the like. The portion of the member 63 that bears against the face of the annulus 71 is cut away, as at 86, so as to reduce friction, and the annulus itself is interrupted, as at 87, to accommodate the pivot carrying arms 61 and 62.

From the description so far, it will be seen that when the parts 63 and 70 are attached, respectively, to the lower end of the plow beam standard 13 and the frog 54 of the plow bottom 50, and are pivotally connected to each other by the pivot bolt 82, the plow bottom 50 is connected with the plow beam 11 for movement relative thereto about a generally longitudinal axis, defined by the pivot pin 59, and a generally transverse axis, defined by the pivot bolt 82. In this connection, it is to be noted that it is a feature of this invention to dispose the two pivots 59 and 82 substantially at or directly behind the approximate center of resistance of the bottom so that forces transmitted through these pivots are at a minimum. It will also be noted that the two axes, defined by the pivot pin 59 and the bolt 82, are disposed in adjacent planes and are as near to one another as practical structural requirements will permit.

In order to have the center of load as nearly directly rearwardly as possible when plowing with a tractor, it is usually necessary to operate with the wheel or wheels of the tractor at one side running in the previously formed furrow. However, this results in lateral tipping of the tractor, and the greater the depth of plowing the greater will be the tilt of the tractor. It will therefore be recognized that to keep the plow bottom level at different operating depths requires that the plow bottom be adjusted about a generally longitudinal axis relative to the plow beam whenever the outfit is adjusted to have a different depth of operation. In the present implement, to adjust the depth of operation requires that the point of the plow bottom be raised or lowered by swinging the plow bottom about the transverse axis defined by the bolt 82. For example, if the point of the plow bottom is raised slightly above the position shown in Figure 1, the tendency is for the plow to elevate itself to a more shallow operating position, seeking a position in which the downward component of the soil pressure against the upper surface of the plow bottom is substantially equal to the upward component of the draft force acting through the beam 11 and the connections described above against the plow bottom 50 substantially at the center of soil pressure thereagainst. On the other hand, if it is desired to plow deeper, then the point of the plow bottom is angled downwardly, which causes the plow bottom to seek a lower position until the upward and downward components, above mentioned, are equal. It was just mentioned, however, that for deeper plowing the tractor is tilted to a greater angle than for shallow plowing, and therefore in order to keep the plow bottom level, whenever the plow bottom is adjusted about its transverse axis to change the depth of plowing, the plow bottom is also adjusted about its longitudinal axis, since, it will be remembered, the plow beam itself is held rigidly with the tractor so far as any movement about a generally longitudinal axis is concerned. According to the present invention I provide a single means suitably connected with the plow bottom to effect simultaneously depth and leveling adjustments, and such adjusting means will now be described.

A combined depth and leveling lever 100 is mounted on a pivot bolt 101, which may be one of the bolts fixing the plates 14 to the beam 12. The lever 100 is provided with conventional detent mechanism 102 which cooperates with a sector 103 fixed to the beam. The sector 103 may be formed as an extension of one of the plates 14, if desired. The end of the lever 100 extends rearwardly beyond the pivot bolt 101 and is provided with a pair of apertures in which the upper ends of a pair of links 106 and 107 are received. The lower ends of the links 106 and 107 are screw-threaded and adjustably receive yokes 108 and 109. Lock nuts 110 and 111 are threaded onto the links 106 and 107 and cooperate with the yokes, which also are threaded to receive the lower ends of the links 106 and 107, for locking them in adjusted position. The yoke 108 at its lower end is connected by a pivot pin 115 to a block 116 which, in turn, is pivotally connected to the outer end of an arm 117, which may be formed as an extension of the arm 61 mentioned above. The yoke 109 of the other link member 107 is connected by a pin 121 to a block 122 which is pivotally connected with the rear portion of the frog iron or attaching plate member 70.

From the above description it will be seen that whenever the hand lever 100 is moved downwardly, an upward pull is exerted on both of the links 106 and 107. The upward pull transmitted through the link 106 acts through the swivel block arm or bracket 117 and swings the plow bottom 50 about the longitudinal axis defined by the pivot pin 59. At the same time, the upward pull transmitted through the other link 107 exerts an upward pull on the attaching casting 70 rearwardly of the transverse pivot 82, thus swinging the plow bottom about its transverse axis and lowering the point, thus providing for deeper plowing. The distances between the pivot bolt 101 and the upper ends of the links 106 and 107, and the distances from the pivot 82 to the pivot of the block 122 and from the pivot 59 and the pivot of the block 116 are so arranged that as the point of the plow bottom is raised or lowered to cause a change in the depth of operation, the plow bottom is swung laterally about the longitudinal axis defined by the pin 59 so as to accommodate the greater or lesser degree of tilt of the tractor for such change in the depth of operation, thereby in effect automatically leveling the plow bottom for any depth of operation. Since, as mentioned above, the pivots 59 and 82 are disposed at or substantially rearwardly of the center of soil pressure against the plow bottom, the pivot connections, including the links 106 and 107, are not subjected to excessive stresses.

The third adjustment, which is also arranged substantially at or adjacent the center of pressure, is that of adjusting the landing of the plow bottom and is effected in the following manner.

As mentioned above, the arms 61 and 62 of the swivel block 63 are apertured to receive the pivot pin or bolt 59 that defines the longitudinal axis about which the plow bottom has swinging movement. The aperture 125 in the arm 62, in which one end of the pivot bolt 59 is disposed, fits the bolt fairly snugly, but the aperture 126 in the other arm 61 is appreciably larger than the bolt and is adapted to receive an eccentric bushing 128 having at one end a head 129. The bushing 128 is provided with a tapered opening 130 to receive the other end of the bolt 59 and accommodates movement of the swivel block 63 in a generally lateral direction when the eccentric bushing 128 is turned to effect a landing adjustment of the plow. The opening 125 in the other arm may also be tapered for the same purpose. By turning the eccentric 128 to effect a landing adjustment laterally, the plow point may also be raised or lowered in the event that an intermediate landing adjustment is desired, but in that case a readjustment of the lever 100 to raise or lower the plow point brings the latter back to the proper position.

The landing adjustment just described is particularly efficacious in permitting the manufacturer to bring the setting of the plow bottom to exactly the desired position, but it will be understood, of course, that the farmer himself may readjust the eccentric bushing 128 whenever he desires to change the landing adjustment. Normally, however, there is little occasion for the farmer to change the landing adjustment after the same has been set properly by the manufacturer. A set screw 133 may be screwed into a tapped hole in the arm 62 for retaining the eccentric bushing 128 in adjusted position.

The plows may be raised into transport position out of engagement with the ground by any suitable means. Preferably, I mount a bracket 141 on the rear end of each of the frame bars 3, the bracket being formed with a sector section 142 and is apertured to receive a short shaft 143. An arm 144 is connected to the shaft 143 and at its outer end is provided with a plurality of apertures 145 to receive a bolt 146 to which the upper end of a chain 147 is connected. The lower end of the chain is connected, as at 148, to the associated plow beam 11. A hand lever 150 is fixed to the shaft 143 so that by swinging the hand lever 150 forwardly the lifting lever 144 is raised and acts through the chain 147 to raise the associated plow into transport position. The weight of the plow may be counterbalanced by suitable springs 152 anchored at their rear ends by an adjusting bolt 153 to a bracket 154 fixed to the plate 141. The forward ends of the springs 152 may be connected to an arm on the shaft 143 or connected in any suitable manner to the lower forward end of the hand lever 150 forward of the shaft 143.

While I have shown and described above the preferred structure in which the principles of the present invention have been incorporated, it is to be understood that my invention is not to be limited to the specific details shown and described above, but that, in fact, widely different means may be employed in the practice of the broader aspects of my invention.

What I claim, therefore, and desire to secure by Letters Patent is:

1. A plow comprising a plow beam, a plow bottom, means for mounting the plow bottom on said beam for swinging movement about generally longitudinal and lateral axes, a member movably mounted on said beam adjacent said plow bottom, and means connecting said member and plow bottom at points on the latter spaced from said axes, whereby movement of said member swings said plow bottom about both of said axes.

2. A plow comprising a plow beam, a plow bottom, means for mounting the plow bottom on said beam for swinging movement about generally longitudinal and lateral axes, and means for adjustably shifting the position of said plow bottom about a third axis adjacent said generally longitudinal and lateral axes.

3. A plow comprising a plow bottom, means for applying draft thereto and with respect to which said plow bottom is relatively movable about different axes, movement of said plow bottom about one axis serving to change the depth of operation and movement about the other axis serving to level the plow bottom, movable means, and means connecting said movable means with different portions of said plow bottom, said points of connection being so disposed relative to said axes whereby movement of said movable means changes the position of said plow bottom on said draft means for changing the depth of operation and simultaneously levels the plow bottom for that depth of operation.

4. A plow comprising a plow beam, a plow bottom connected with the rear end of said beam for movement relative thereto about different axes, a member movably connected with said beam, and means connecting said member with said plow bottom at different points on the latter, whereby movement of said member adjusts the depth of operation of said plow bottom and simultaneously levels the latter.

5. A plow comprising a plow beam, a plow bottom, means connecting the latter with said beam for swinging movement about generally lateral and longitudinal axes, and a single movable part operatively connected with said plow bottom for swinging the latter relative to said plow beam about both of said axes.

6. A plow comprising a plow bottom, a beam, means pivotally connecting said bottom to said beam for movement relative thereto about longitudinal and transverse axes, a lever mounted on said beam, and a pair of links extending from said lever to said plow bottom and connected thereto so that movement of said one lever causes movement of said plow bottom about both of said axes relative to said plow beam.

7. In a plow, in combination, a wheeled frame adapted to run partially in a furrow, furrow opening means, a beam extending between the latter and said wheeled frame and constraining the furrow opening means to tilt laterally with said frame, means movably connecting said furrow opening means to said beam for movement relative thereto about longitudinal and transverse axes, an adjusting member, a connection between said adjusting member and said furrow opening means for changing the operating depth of the latter, and a connection between said adjusting member and said furrow opening means for leveling the latter so as to accommodate the corresponding change in the tilt of said wheel frame.

8. A plow comprising a plow beam, a plow bottom fixed thereto for movement about a generally longitudinal axis and also about a generally transverse axis, a pivotally mounted lever, and means serving as a pair of connections extending from said lever to said plow bottom and connected therewith at points spaced, respectively, from said axis, whereby pivotal movement of said lever swings said plow bottom about both of its axes.

9. In a plow, a standard, a plow bottom, means fixing said plow bottom to said standard for swinging movement relative thereto about a longitudinal axis and a transverse axis, a movably mounted member, and means connecting said member with said plow bottom at points spaced from both of said axis whereby movement of said member is effective to swing said plow bottom relative to said standard about both of said axes.

10. In a plow, in combination, a wheeled frame adapted to run partially in a furrow, furrow opening means, a draft connection between said means and frame, means to simultaneously level the furrow opening means and adjust the operating depth thereof so as to accommodate the position of said wheeled frame in the furrow opened at said depth, and means for shifting said furrow opening means in a generally lateral direction relative to said draft connection to adjust the landing of said furrow opening means.

11. A plow comprising a plow beam, a plow bottom, a member pivotally connected with said plow bottom for movement relative thereto about a generally transverse axis, means pivotally connecting said member with said beam for movement relative thereto about a generally longitudinal axis, and means for shifting said axis generally laterally to adjust the landing of the plow bottom.

12. A plow comprising a beam member, a plow bottom member, means serving as a pivot extending generally in a longitudinal direction and carried by one of said members, means on the other member receiving said pivot, whereby said plow bottom member may swing about a generally longitudinal axis relative to said beam member, and including an eccentric whereby the angular position of said pivot relative to said other member may be adjusted.

13. A plow comprising a plow beam, a plow bottom, and means including an eccentric bushing pivotally connecting said plow bottom to said beam to provide for two adjustments of the plow bottom relative to said beam.

14. A plow comprising a plow bottom, a member pivotally connected with said plow bottom for movement relative thereto about a generally transverse axis, a pivot pin carried by said member and extending generally longitudinally of said plow bottom, adjacent said transverse pivot axis, and a plow beam having a sleeve-like portion receiving said pivot pin, whereby said plow bottom may be swung in a generally laterally or longitudinal direction relative to said plow beam.

15. A plow comprising a plow bottom, a swivel block having a pair of spaced apertured arms and carrying a laterally extending bracket, means pivotally connecting said swivel block to said plow bottom for relative movement about a generally transverse axis, a pivot pin disposed in the apertures in said spaced arms, a plow beam having a downturned end provided with a longitudinally disposed sleeve section adapted to receive said pivot pin, whereby said swivel block and said plow bottom may pivot relative to said plow beam about a generally longitudinal axis, an eccentric bushing carried by one of said arms and receiving one end of the associated pivot, whereby rotation of said eccentric serves to adjust the landing of the plow bottom on said beam, and means reacting against said beam and connected with said plow bottom and said bracket for simultaneously shifting the position of said plow bottom relative to said beam about said transverse axis and the axis defined by said pivot pin.

16. A plow comprising a plow bottom, a member pivotally connected with said plow bottom for movement relative thereto about a generally transverse axis, a pivot pin carried by said member and extending generally longitudinally of said plow bottom, a plow beam receiving said pivot pin, means for shifting said pin generally laterally relative to said member for adjusting the landing of said plow bottom, and means for shifting said member and said bottom about said transverse axis.

AUSTIN E. YOUNG.